(12) United States Patent
Raman et al.

(10) Patent No.: US 8,467,294 B2
(45) Date of Patent: Jun. 18, 2013

(54) DYNAMIC LOAD BALANCING FOR PORT GROUPS

(75) Inventors: Pirabhu Raman, San Jose, CA (US); Deepak Cherian, Newark, CA (US); Hariharan Balasubramanian, Oak Park, CA (US); Ramprasad Nagaraja Rao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 12/931,821

(22) Filed: Feb. 11, 2011

(65) Prior Publication Data

US 2012/0207175 A1  Aug. 16, 2012

(51) Int. Cl.
*G01R 31/08* (2006.01)

(52) U.S. Cl.
USPC ........................................... 370/235; 370/412

(58) Field of Classification Search
CPC ......... H04L 45/48; H04L 45/00; H04L 12/462; G06F 3/0635; G06F 3/067
USPC ................ 370/229, 230, 235, 386–390, 412, 370/416, 419
See application file for complete search history.

(56) References Cited

U.S. PATENT DOCUMENTS

| 6,073,199 | A | 6/2000 | Cohen et al. | |
|---|---|---|---|---|
| 6,473,424 | B1 | 10/2002 | DeJager et al. | |
| 7,623,455 | B2 | 11/2009 | Hilla et al. | |
| 2002/0048280 | A1* | 4/2002 | Lee et al. | 370/468 |
| 2005/0190779 | A1 | 9/2005 | Hoffman et al. | |
| 2006/0171318 | A1 | 8/2006 | Bergamasco et al. | |
| 2008/0175259 | A1* | 7/2008 | Chao et al. | 370/413 |
| 2010/0061392 | A1* | 3/2010 | Iny | 370/412 |

* cited by examiner

*Primary Examiner* — Jung Park
(74) *Attorney, Agent, or Firm* — Cindy Kaplan

(57) ABSTRACT

In one embodiment, a method includes receiving a packet at an input port of a network device, the input port having a plurality of queues with at least one queue for each output port at the network device, identifying a port group for transmitting the packet from the network device, the port group having a plurality of members each associated with one of the output ports, and selecting one of the queues based on utilization of the members. An apparatus for load balancing is also disclosed.

20 Claims, 6 Drawing Sheets

DYNAMIC LOAD BALANCING FOR PORT GROUPS

TECHNICAL FIELD

The present disclosure relates generally to communication networks, and more particularly, to dynamic load balancing.

BACKGROUND

Load balancing is used to distribute traffic across two or more communication paths. The load balancing may be performed, for example, to distribute traffic across members of a port group. Conventional flow based load balancing for port groups may not provide maximum utilization of links and may cause over-subscription and congestion issues regardless of the amount of available or provisioned bandwidth.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises receiving a packet at an input port of a network device, the input port comprising a plurality of queues with at least one queue for each output port at the network device, identifying a port group for transmitting the packet from the network device, the port group comprising a plurality of members each associated with one of the output ports, and selecting one of the queues based on utilization of the members.

In another embodiment, an apparatus generally comprises a plurality of output ports, at least one input port comprising a plurality of queues with at least one queue for each of the output ports, and a load balancer for identifying a port group for transmitting a packet received at the input port, and selecting one of the queues based on utilization of members of the port group.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

The embodiments described herein provide dynamic load balancing to improve utilization of links for port groups at network devices configured for virtual output queuing (VoQ). The port group may include, for example, a port channel, a high bandwidth port using multiple queues, Layer 2 (L2) or Layer 3 (L3) ECMP (equal cost multi-path), or other network topologies or network device configurations in which traffic is load balanced across two or more members (e.g., links, ports, queues, paths, etc.). As described below, the embodiments operate in the context of a data communication network including multiple network elements.

Figure 1:
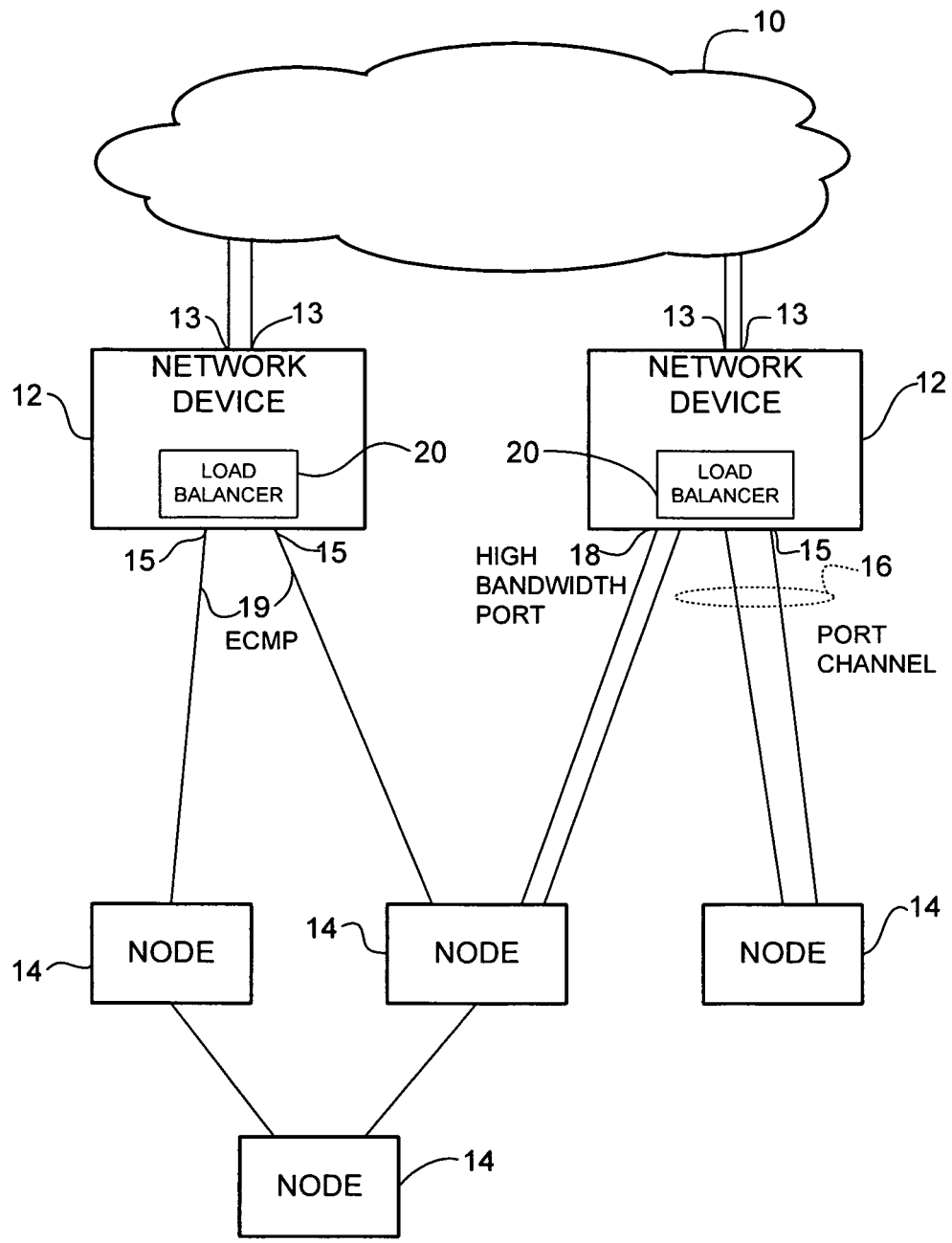
FIG. 1 illustrates an example of a network in which embodiments described herein may be implemented.

Referring now to the figures, and first to FIG. 1, an example of a network that may implement embodiments described herein is shown. The network includes network devices 12 in communication with a network 10 and nodes 14 via a plurality of links. The nodes 14 may be servers, hosts, clients, end stations, switches, routers, or any other network element. The network device 12 may be a switch (e.g., access layer switch, aggregation layer switch), router, or any other network device capable of performing forwarding operations. For example, the network device 12 may be a NEXUS series switch available from Cisco Systems, Inc. of San Jose, Calif. Each network device 12 includes a plurality of ports located at the ends of the physical links. The term 'port' as used herein may refer to the physical interface and module (e.g., linecard) associated therewith. In the example shown in FIG. 1, each network device 12 includes input ports 13 and output ports 15. It is to be understood that the input ports may also be used as output ports and vice versa. The terms input and output are used herein in reference to traffic received at the input ports 13 and transmitted from the output ports 15.

The network device 12 may be in communication with one or more of the nodes 14 through physical links configured as a logical link or port channel (also referred to as EtherChannel) 16. A link aggregation control protocol may be used to aggregate several links or ports into a logical link or port channel. One or more of the ports at the network device may be a high bandwidth port 18. For example, the network device 12 may include one or more high bandwidth output ports and a plurality of lower bandwidth input ports. The network device 12 may also be in communication with one or more of the nodes 14 via equal cost multi-paths 19. The ECMPs 19 may also include port channels.

Each network device 12 includes a load balancer 20 configured for balancing traffic over one or more port groups. The port group may comprise the port channel 16, high bandwidth port 18, ECMP 19, or any other group comprising members (e.g., ports, queues, paths) over which traffic is load balanced.

It is to be understood that the simplified network shown in FIG. 1 is only an example and that the embodiments described herein may be implemented in other networks having different topologies or network devices, without departing from the scope of the embodiments.

Figure 2:
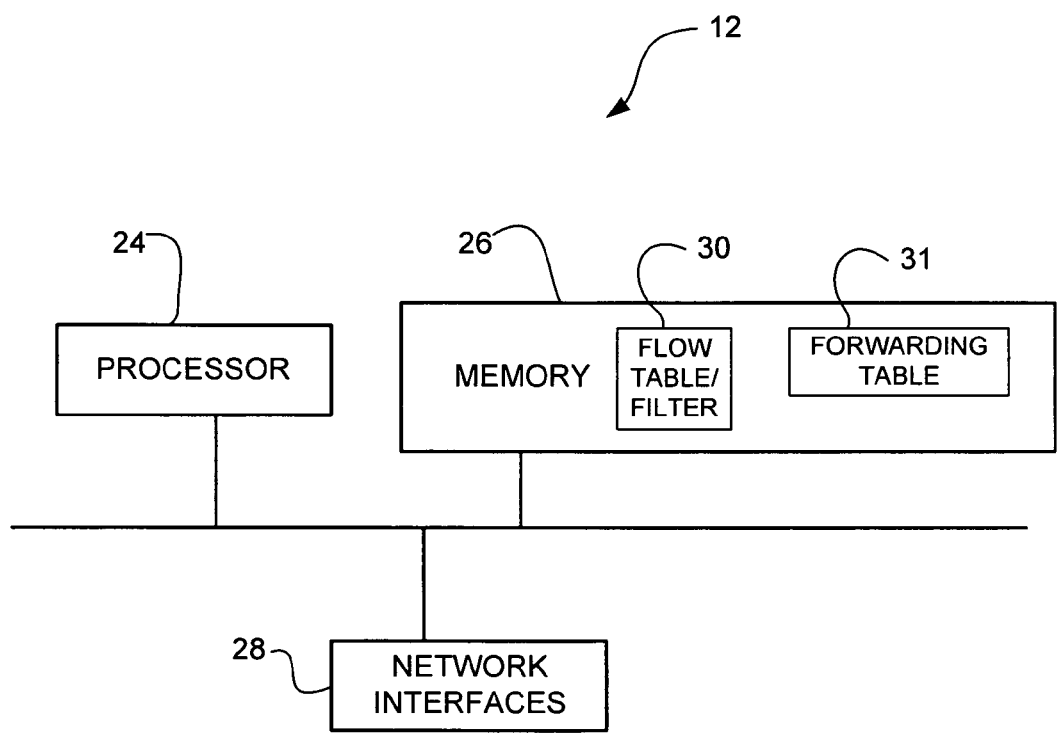
FIG. 2 is a block diagram illustrating an example of a network device useful in implementing embodiments described herein.

An example of a network device 12 that may be used to implement embodiments described herein is shown in FIG. 2. In one embodiment, the network device 12 is a programmable machine that may be implemented in hardware, software, or any combination thereof. The network device 12 includes one or more processors 24, memory 26, and network interfaces 28. As described below, the network device 12 includes components operable to perform load balancing functions.

Memory 26 may be a volatile memory or non-volatile storage, which stores various applications, modules, and data for execution and use by the processor 24. Memory 26 may include one or more flow table/filter 30 and forwarding table 31 (described below) for use in selecting a port group or member at which to forward a packet from the network device. The flow table may be, for example, content addressable memory (CAM). Programming of the flow table/filter 30 and forwarding table 31 may be implemented in software. Logic may be encoded in one or more tangible media for execution by the processor 24. For example, the processor 24 may execute codes stored in a computer-readable medium such as memory 26. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 28 may comprise wireless or wired interfaces (linecards, ports) for receiving signals or data or transmitting signals or data to other devices. The network interfaces 28 may incorporate Ethernet interfaces, Gigabit Ethernet interfaces, 10-Gigabit Ethernet interfaces, SONET interfaces, etc. As packets are received, processed, and forwarded by the network device 12, they may be stored in memory 26 (e.g., in buffers or queues). Linecards may also incorporate processing and memory resources similar to those discussed above in connection with the network device as a whole.

Figure 3:
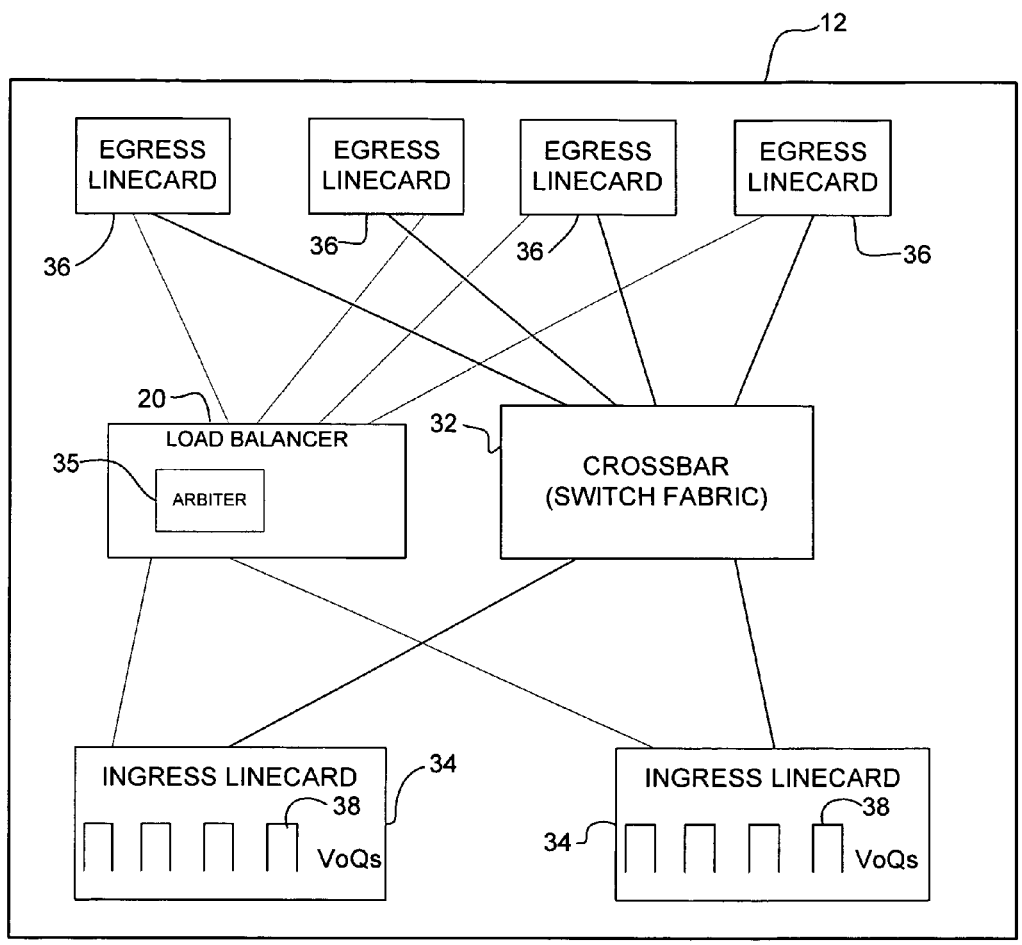
FIG. 3 is a block diagram illustrating details of the network device in the network of FIG. 1, in accordance with one embodiment.

FIG. 3 illustrates details of the network device 12 of FIG. 1, in accordance with one embodiment. The network device 12 includes two input ports each comprising an ingress module (e.g., linecard) 34 and four output ports each comprising an egress module (e.g., linecard) 36. The ingress linecards 34 transmit traffic to the egress linecards 36 via a crossbar (e.g., switch fabric) 32. Data (e.g., packet, frame, cell, message, traffic stream) may be forwarded from any of the ingress linecards 34 to any of the egress linecards 36. In the example shown in FIG. 3, each ingress linecard 34 includes four queues (referred to herein as input queues or virtual output queues) 38, one for each output port. Each egress linecard 36 may also include one or more queues (referred to as output queues) (not shown).

In one embodiment, the network device 12 utilizes virtual output queuing in which each input port maintains a separate queue 38 for each output port. In the example shown in FIG. 3, each ingress linecard 34 includes at least one virtual output queue (VoQ) 38 for each egress port (or egress queue). The ingress linecard 34 may include more than one queue for one or more of the output ports (e.g., multiple queues or queue indices for use with high bandwidth ports). Each virtual output queue 38 may include packets from more than one flow.

The load balancer 20 balances traffic received at the input port and destined for a port group, over members of the port group. The load balancer 20 identifies a port group for transmitting a packet (e.g., receives a port group identified in a forwarding table lookup) and selects a member of the port group to transmit the packet. In one embodiment, the load balancer 20 includes an arbiter 35 for use in selecting a member of the port group to transmit a packet or flow. The arbiter 35 manages data flow between the virtual output queues 38 and the egress linecards 36. The arbiter 35 may operate according to any applicable arbitration algorithm and may be implemented in hardware or software. In one embodiment, the arbiter 35 grants credit to the queues 38 at the ingress linecards 34 based on occupancy of output queues at the egress linecards 36. Each output queue at the egress linecard 36 sends backpressure status to the arbiter 35 indicating if it is ready to receive data from the input queues 38. The arbiter 35 uses this status to grant credit to the input queues 38. This allows the input queues 38 to transmit data to the output queues when there is space available at the output queues. Utilization of the destination port can therefore be estimated by monitoring occupancy level of the virtual output queue 38 corresponding to the destination port. The load balancer 20 selects the destination port and corresponding virtual output queue 38 based on the queue occupancy levels as well as the number of active flows.

Packets from a given traffic flow (stream) may be forwarded on the same member for at least a specified period of time to provide a persistent (sticky) connection and prevent packets from being forwarded out of order. In one embodiment, a flow based hash is performed on certain fields in the packet that are the same for all packets in a particular flow. The hash algorithm identifies flows based on any combination of fields in a packet (e.g., source port, source address (IP, MAC), destination port, destination address, VLAN (virtual local area network), switch/RBridge/device identifier). The flow identifier is used to index a flow in the flow table 30, which stores the member currently assigned to the flow. The flow table 30 may be maintained, on a per input port basis, per destination basis (e.g., switch ID), or per logical interface basis (e.g., port channel, high bandwidth port). In one example, states are maintained in the flow table 30 for a flow based hash and destination pair. The destination may be a MAC address, IP address, or network device identifier based on the lookup involved. Entries in the flow table 30 may be cleared after passage of time sufficient to allow packets of a given flow to be forwarded by a port before a different port is allocated to transmit packets of the same flow, for example.

In one embodiment, one or more load balancing functions are implemented in hardware. One or more of the fabric 32, load balancer 20, queues 38, and forwarding engine may be integrated on one or more ASICs (application specific integrated circuits), for example. The embodiments described herein may be applied to members of a port group that are spread across different modules (e.g., linecards), ASICs or forwarding engines. The embodiments preferably interoperate with other ASIC modules that do not support this capability.

It is to be understood that the network device 12 shown in FIGS. 2 and 3, and described herein are only examples and that different configurations of network devices may be used.

Figure 4:
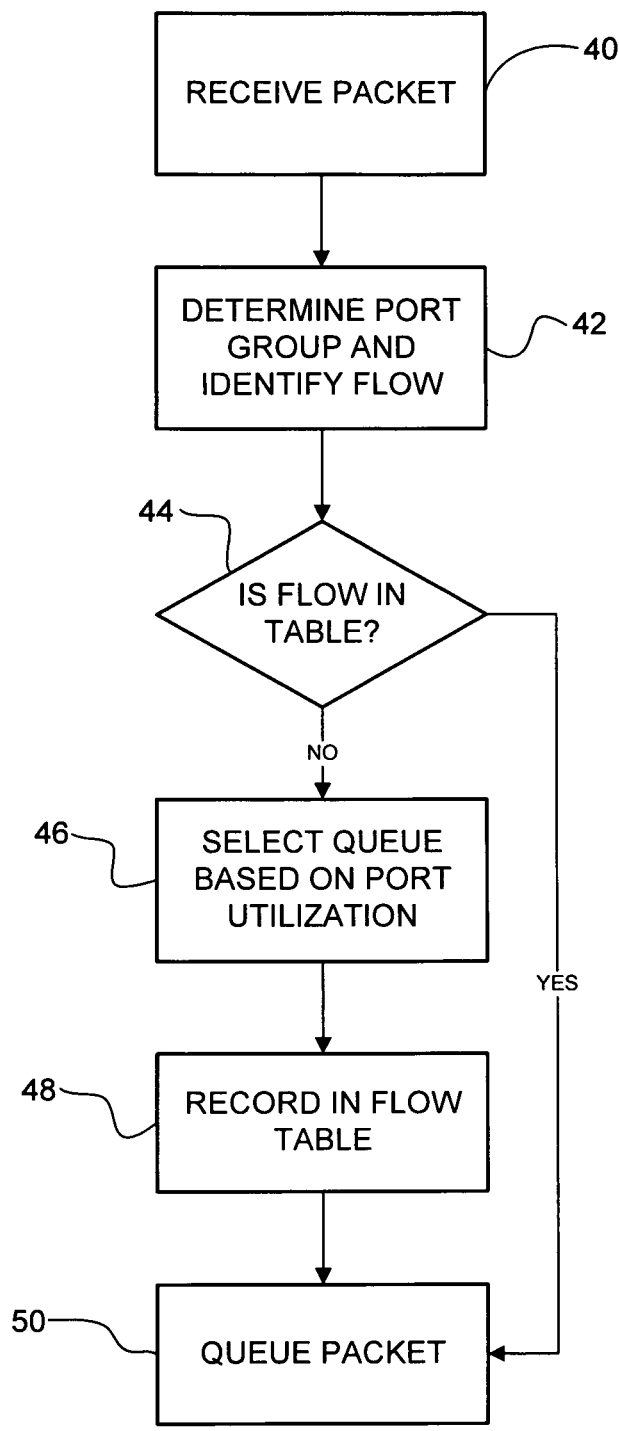
FIG. 4 is a flowchart illustrating an overview of a process for dynamic load balancing, in accordance with one embodiment.

FIG. 4 is a flowchart illustrating an overview of a process for dynamic load balancing with the network device 12 of FIG. 3, in accordance with one embodiment. As shown in the examples of FIGS. 1 and 3, the network device 12 includes a plurality of input and output ports. The input port includes a plurality of queues with at least one queue for each of the output ports. At step 40 the network device 12 receives a packet. Information in the packet is used to determine the port group for transmitting the packet and a flow associated with the packet is identified (step 42). As described above, the port group includes a plurality of members each associated with one of the output ports. The network device 12 may perform a lookup in forwarding table 31 to find a port group for the packet. The forwarding table 31 may be a forwarding table at a switch, routing table at a router, or any other data structure for use in identifying a destination interface based on information contained in the packet. A hash calculation may also be performed to identify a flow for the packet. If the flow is already in the flow table 30, the packet is placed in the same queue 38 to which packets from the same flow have previously been assigned (steps 44 and 50).

If the flow is not in the flow table 30, the virtual output queue 38 corresponding to a member of the port group is selected based on utilization of the members (step 46). For example, if the packet received at the ingress line card 34 is to be sent out on one of the members of a port channel, any of the queues 38 corresponding to an output port that is a member of the port channel may be selected. If the packet is to be sent out on a high bandwidth port, any of the queues 38 corresponding to the high bandwidth port may be selected. If the packet is to be sent out on a path of an ECMP, any of the queues 34 corresponding to an output port that is connected to one of the links of the multipath may be selected. In one embodiment, utilization of the members is based on occupancy level at the virtual output queues 38 corresponding to the members. The load balancer 20 selects the queue 38 that has the lowest occupancy level. The virtual output queue occupancy level preferably reflects link utilization by sources in local as well as remote modules. In one embodiment, the occupancy level at the virtual output queue 38 is based on credits granted to the queue by the arbiter 35 when packets are transmitted from the egress queue at the corresponding destination port, as previously described.

Once the virtual output queue (associated with a destination port) is selected, the flow is recorded in the flow table 30 so that packets received that are associated with the same flow are assigned to the same virtual output queue 38 (step 48). The packet is assigned to the selected queue (step 50) and forwarded to the corresponding destination port. Assigning the packet to the queue may include storing classification and pointer information for the packet in the queue or storing the packet in the queue.

It is to be understood that the process described above and shown in FIG. 4 is only one example and that steps may be removed, added, combined, or reordered, without departing from the scope of the embodiments.

Figure 5:
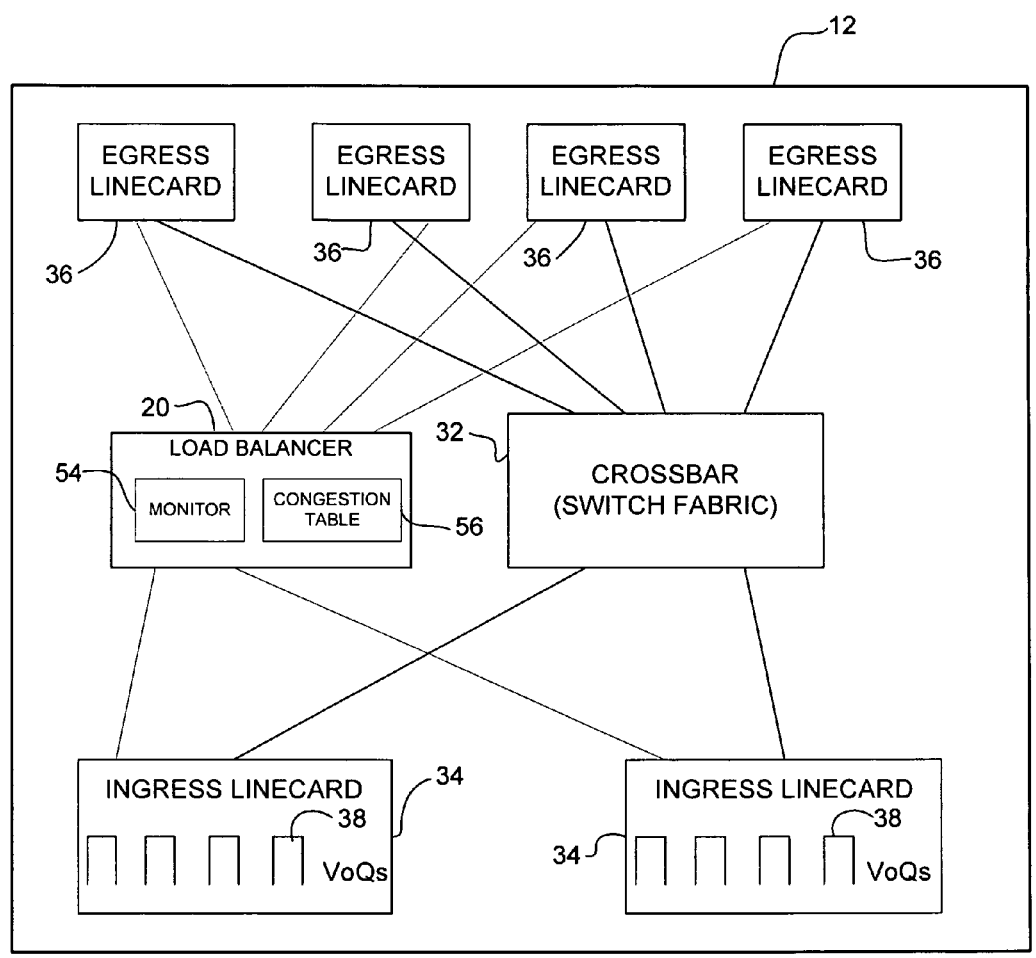
FIG. 5 is a block diagram illustrating details of the network device in the network of FIG. 1, in accordance with another embodiment.

FIG. 5 illustrates details of the network device 12 of FIG. 1, in accordance with another embodiment. As described above with respect to FIG. 3, the network device 12 includes two input ports each comprising an ingress module (e.g., linecard) 34 and four output ports each comprising an egress module (e.g., linecard) 36. The ingress linecards 34 transmit traffic to the egress linecards 36 via a crossbar (e.g., switch fabric) 32. The network device 12 may utilize virtual output queuing in which each input port maintains a separate queue 38 for each output port. Each ingress linecard 34 includes at least one virtual output queue (VoQ) 38 for each egress port (or egress queue). The ingress linecard 34 may include more than one queue for one or more of the output ports (e.g., multiple queues or queue indices for use with high bandwidth ports). Each virtual output queue 38 may include packets from more than one flow.

The load balancer 20 balances traffic received at the input port and destined for a port group, over members of the port group. The load balancer 20 identifies a port group for transmitting a packet (e.g., receives a port group identified in a forwarding table lookup) and selects a member of the port group to transmit the packet. In the example shown in FIG. 5, the load balancer 20 includes a monitor 54 for monitoring each of the virtual output queues 38. In one embodiment, the monitor 54 categorizes the congestion state (occupancy level) of each of the virtual output queues 38 in a congestion table 56. The monitor 54 may also be configured for Fibre Channel Congestion Control (FCC), Backward Congestion Notification (BCN), or IEEE 802.1Q Congestion Notification (QCN), for example. The congestion of the queues may be categorized, for example, into three classes, low congestion, medium congestion, and high congestion. It is to be understood that this is only an example and other categories or classifications may be used.

Figure 6:
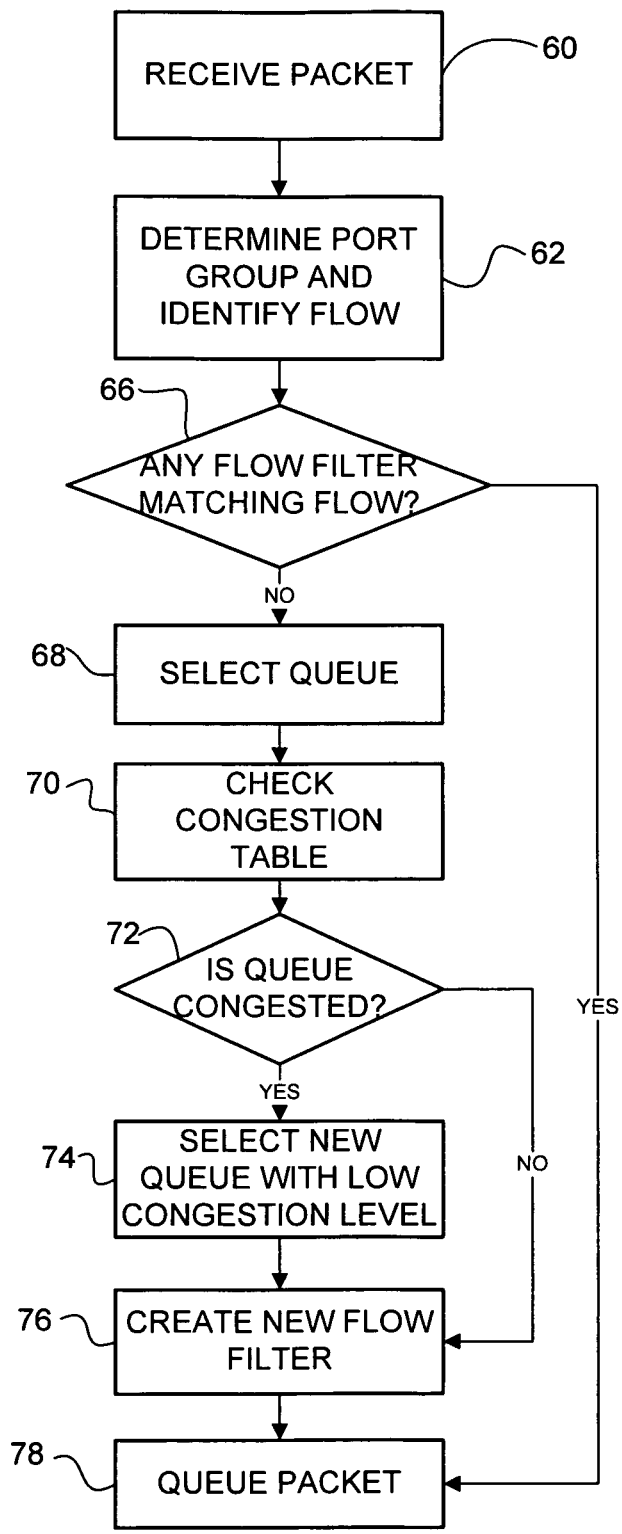
FIG. 6 is a flowchart illustrating an overview of a process for dynamic load balancing, in accordance with another embodiment.

FIG. 6 is a flowchart illustrating an overview of a process for dynamic load balancing with the network device 12 of FIG. 5, in accordance with one embodiment. As shown in the examples of FIGS. 1 and 5, the network device 12 includes a plurality of input and output ports. The input port includes a plurality of queues with at least one queue for each of the output ports. At step 60 the network device 12 receives a packet. Information in the packet is used to determine the port group for transmitting the packet and a flow associated with the packet is identified (step 62). As described above, the port group includes a plurality of members each associated with one of the output ports. The network device 12 may perform a lookup in the forwarding table 31 to find a port group for the packet. A hash calculation may also be performed to identify a flow for the packet. If the flow matches an existing flow filter 30, then the queue that the packet is directed to by the filter is used (steps 66 and 78).

If no flow filter exists for the flow to which the packet belongs, the virtual output queue 38 corresponding to a member of the port group is selected based on utilization of the queues (steps 68-74). An initial queue is first selected based on conventional load balancing (step 68). The congestion table 56 is checked to determine if the queue selected at step 68 is congested (step 70). If the selected queue is not congested (e.g., congestion state low), the initially selected queue is used to queue the packet and a new flow filter is created (steps 72 and 76). If the queue selected at step 68 is congested (e.g., congestion state above a specified threshold), another queue is selected. For example, if the congestion table 56 indicates that the queue selected has high congestion, a queue with the least congestion may be selected. Information about the selected queue is cached in flow filter 30 (step 76) so that subsequent packets associated with the same flow select the same queue as long as the queue does not get congested. The packet is assigned to the selected queue (step 78) and forwarded to the corresponding destination port.

It is to be understood that the process described above and shown in FIG. 6 is only one example and that steps may be removed, added, combined, or reordered, without departing from the scope of the embodiments.

The flow filter 30 may be removed if no longer needed for a flow. For example, the flow filter may be removed if no packets associated with the flow are received within a specified period of time. In one example, a timer may be set after a packet for the flow is received and the filter aged out after the timer expires if no additional packets for that flow are received. Also, the flow filter may be removed if an indication is received that no more packets for the flow are to be transmitted (e.g., exchange ID in FC flow, FIN packet).

The flow filter 30 may also be modified based on congestion levels of the queues. For example, if one of the queues that the flow filter is directing flow to becomes congested, the filter may be updated to direct packets for that flow to a less congested queue. Also, if the congestion level is reduced at a set of queues, the flow filters may no longer be needed.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving a packet at an input port of a network device, the input port comprising a plurality of queues comprising at least one queue for each output port at the network device;
   monitoring said plurality of queues and categorizing a congestion state of each of said plurality of queues in a congestion table;
   identifying a port group for transmitting the packet from the network device, the port group comprising a plurality of members each associated with one of the output ports; and
   selecting one of said plurality of queues based on utilization of said members, wherein selecting one of said plurality of queues based on utilization of said members comprises selecting one of said plurality of queues based on load balancing, checking said congestion state of said selected queue, and selecting another of said plurality of queues if said congestion state is above a specified threshold.

2. The method of claim 1 wherein selecting one of said plurality of queues further comprises if the packet is associated with a flow assigned to one of the output ports, assigning the packet to said queue associated with the output port.

3. The method of claim 1 wherein the port group comprises a port channel and said members comprise the output ports assigned to the port channel.

4. The method of claim 1 wherein the port group comprises one of said output ports comprising a high bandwidth port and said members comprise said queues associated with the output port.

5. The method of claim 1 wherein the port group comprises multiple paths and said members comprise the output ports connected to links in said multiple paths.

6. The method of claim 1 wherein selecting one of said plurality of queues based on utilization of said members comprises monitoring an occupancy level of each of said plurality of queues.

7. An apparatus comprising:
   a plurality of output ports;
   at least one input port comprising a plurality of queues comprising at least one queue for each of the output ports;
   a monitor for monitoring said plurality of queues and categorizing a congestion state of each of said plurality of queues in a congestion table; and
   a load balancer for identifying a port group for transmitting a packet received at the input port, the port group comprising a plurality of members each associated with one of the output ports, and selecting one of said plurality of queues based on utilization of said members, wherein selecting one of said plurality of queues based on utilization of said members comprises selecting one of said plurality of queues based on load balancing, checking said congestion state of said selected queue, and selecting another of said plurality of queues if said congestion state is above a specified threshold.

8. The apparatus of claim 7 wherein selecting one of said plurality of queues further comprises if the packet is associated with a flow assigned to one of the output ports, assigning the packet to said queue associated with the output port.

9. The apparatus of claim 7 wherein the port group comprises a port channel and said members comprise the output ports assigned to the port channel.

10. The apparatus of claim 7 wherein the port group comprises one of said output ports comprising a high bandwidth port and said members comprise said queues associated with the output port.

11. The apparatus of claim 7 wherein the port group comprises multiple paths and said members comprise the output ports connected to links in said multiple paths.

12. The apparatus of claim 7 wherein selecting one of said plurality of queues based on utilization of said plurality of members comprises monitoring an occupancy level of each of said plurality of queues.

13. The apparatus of claim 7 further comprising a flow filter for directing a flow associated with the received packet to said selected queue.

14. An apparatus comprising:
   a plurality of output ports;
   at least one input port comprising a plurality of queues comprising at least one queue for each of the output ports;
   a monitor for monitoring said plurality of queues and categorizing a congestion state of each of said plurality of queues in a congestion table; and
   means for identifying a port group for transmitting the packet from the network device, the port group comprising a plurality of members each associated with one of the output ports; and
   means for selecting one of said plurality of queues based on utilization of said plurality of members, wherein means for selecting one of said plurality of queues based on utilization of said members comprises means for selecting one of said plurality of queues based on load balancing, checking said congestion state of said selected queue, and selecting another of said plurality of queues if said congestion state is above a specified threshold.

15. The apparatus of claim 14 wherein means for selecting one of said plurality of queues further comprises if the packet is associated with a flow assigned to one of the output ports, means for assigning the packet to said queue associated with the output port.

16. The apparatus of claim 14 further comprising an arbiter for assigning credit to said plurality of queues based on an occupancy level of queues at the output ports and wherein means for selecting one of said plurality of queues based on utilization of said plurality of members comprises means for monitoring an occupancy level of each of said plurality of queues.

17. The method of claim 1 wherein said congestion state is based on an occupancy level of each of said plurality of queues.

18. The method of claim 1 further comprising storing information about the selected queue in a flow filter.

19. The apparatus of claim 7 further comprising memory for storing the congestion table.

20. The apparatus of 7 wherein said congestion state is categorized into at least three classes.

* * * * *